(12) United States Patent
Chan

(10) Patent No.: US 7,358,859 B2
(45) Date of Patent: Apr. 15, 2008

(54) WEATHER STATION APPARATUS

(75) Inventor: Raymond Chan, Hunghorn (HK)

(73) Assignee: IDT Technology Limited, Hunghom, Kowloon (HK)

( * ) Notice: Subject to any disclaimer, the term of this patent is extended or adjusted under 35 U.S.C. 154(b) by 64 days.

(21) Appl. No.: 11/133,296

(22) Filed: May 20, 2005

(65) Prior Publication Data

US 2006/0261943 A1    Nov. 23, 2006

(51) Int. Cl.
*G01W 1/00* (2006.01)
(52) U.S. Cl. .................. 340/601; 340/602; 340/691.6
(58) Field of Classification Search ........... 340/539.28, 340/601, 602, 600, 691.1, 691.6, 815.4, 815.43, 340/815.56; 345/88; 349/114
See application file for complete search history.

(56) References Cited

U.S. PATENT DOCUMENTS

| | | | | |
|---|---|---|---|---|
| 5,499,024 | A | * | 3/1996 | Germanton et al. ... 340/870.17 |
| 5,628,050 | A | * | 5/1997 | McGraw et al. ........... 455/12.1 |
| 5,920,827 | A | * | 7/1999 | Baer et al. ..................... 702/3 |
| 6,076,044 | A | | 6/2000 | Brown |
| 6,297,766 | B1 | * | 10/2001 | Koeller .................. 342/357.06 |
| 6,617,964 | B1 | * | 9/2003 | Lamb .................... 340/286.02 |
| 6,967,900 | B2 | * | 11/2005 | Chapman .................... 368/10 |
| 7,171,307 | B2 | * | 1/2007 | Matsumoto .................... 702/3 |
| 2005/0151656 | A1 | * | 7/2005 | Yuen .......................... 340/601 |

FOREIGN PATENT DOCUMENTS

GB    2 186 380    8/1987

OTHER PUBLICATIONS

"A colourful window on the world-Weather forecasting at a glance" [Online] (Dec. 23, 2003), Retrieved from the Internet: URL:http://www.oregonscientific.co.uk/press_detail.asp?p=23.

* cited by examiner

*Primary Examiner*—Toan N. Pham
(74) *Attorney, Agent, or Firm*—Leydig, Voit & Mayer, Ltd.

(57) ABSTRACT

A weather station apparatus for measuring and indicating weather information, having a base station and a remote indicator. The base station includes a microprocessor (MCU) for evaluating weather information relating to an atmospheric parameter. At least one sensor is associated with the MCU for sensing the atmospheric parameter for subsequent processing by the MCU. An RF transmitter is included for transmitting a wireless signal representing the weather information evaluated by the MCU. The indicator includes an RF receiver for receiving the wireless signal from the transmitter, a control circuit for processing the wireless signal, and a color-changing light source controlled by the control unit to indicate the weather information represented by the wireless signal in a color that is dependent upon the value of the weather information.

10 Claims, 5 Drawing Sheets
(1 of 5 Drawing Sheet(s) Filed in Color)

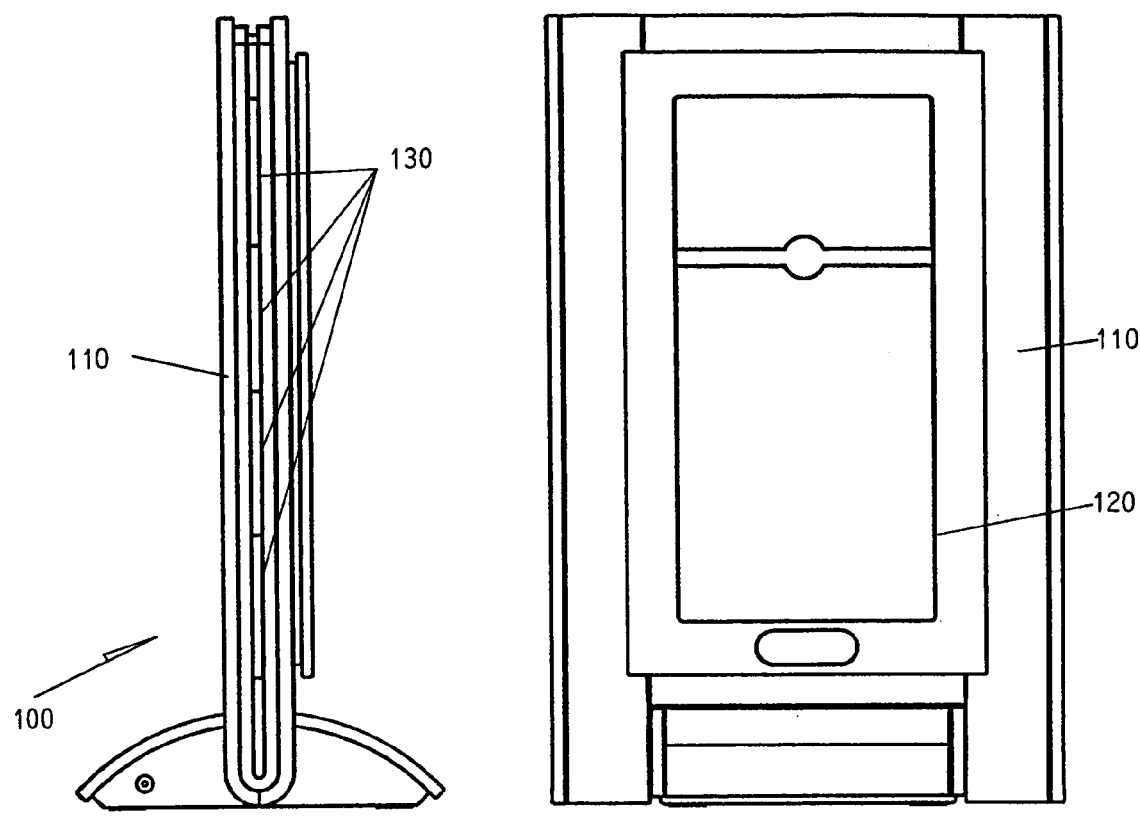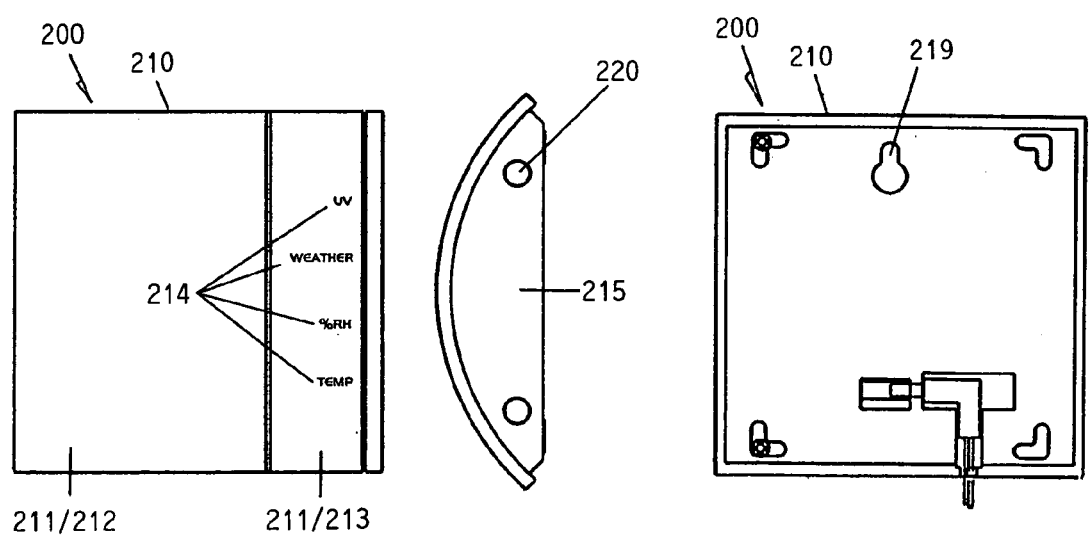

Temperature

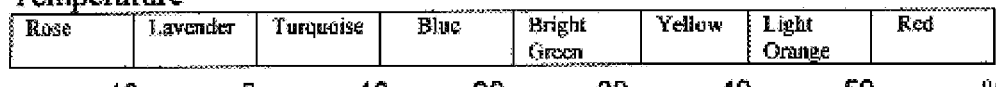

| Rose | Lavender | Turquoise | Blue | Bright Green | Yellow | Light Orange | Red |
|------|----------|-----------|------|--------------|--------|--------------|-----|

-10 ——— 0 ——— 10 ——— 20 ——— 30 ——— 40 ——— 50     °C

Humidity

| Light Orange | Yellow | Bright Green | Turquoise | Blue |
|--------------|--------|--------------|-----------|------|

20 ——— 40 ——— 60 ——— 80     %

Weather Forecast

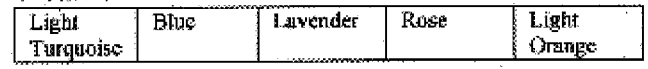

| Light Turquoise | Blue | Lavender | Rose | Light Orange |
|-----------------|------|----------|------|--------------|

Snowy   Rainy   Cloudy   P-Cloudy   Sunny

UV Index

| Bright Green | Yellow | Light Orange | Red | Pink |
|--------------|--------|--------------|-----|------|

0 – 2    3 – 5    6 – 7    8 – 10    11+    UVI

FIG. 9

Temperature

-10 ——— 0 ——— 10 ——— 20 ——— 30 ——— 40 ——— 50     °C

Humidity

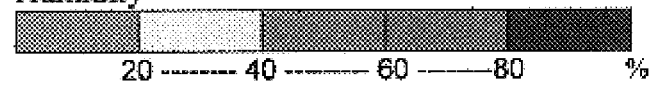

20 ——— 40 ——— 60 ——— 80     %

Weather Forecast

Snowy   Rainy   Cloudy   P-Cloudy   Sunny

UV Index

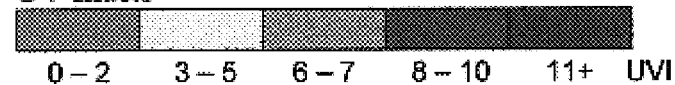

0 – 2    3 – 5    6 – 7    8 – 10    11+    UVI

FIG. 10

WEATHER STATION APPARATUS

The present invention relates to weather station apparatus for indicating weather conditions.

BACKGROUND OF THE INVENTION

Weather stations (or monitors) for indicating weather conditions are generally known, which may incorporate other functions or be included as part or a function of an equipment of another type and in particular a clock. Various types of weather information, such as temperature, humidity and weather forecast, are typically indicated by numerical values and/or graphical symbols on an LCD display. These manners of indication are often felt inconvenient or monotonous to read.

The invention seeks to obviate or at least alleviate such shortcoming by providing new or improved weather station apparatus.

SUMMARY OF THE INVENTION

According to the invention, there is provided weather station apparatus for measuring and indicating weather information, having a base station and a remote indicator. The base station comprises a housing and a microprocessor control unit in the housing for operation and control, including evaluating weather information relating to an atmospheric parameter. At least one sensor is associated with the microprocessor control unit for sensing the atmospheric parameter for subsequent processing by the microprocessor control unit. There is a transmitter in the housing for transmitting a wireless signal representing the weather information evaluated by the microprocessor control unit. The indicator comprises a casing, a receiver in the casing for receiving said wireless signal from the transmitter, and a control circuit in the casing for processing said wireless signal. There is a color-changing light source in the casing and controlled by the control unit for illumination to indicate the weather information represented by said wireless signal in a color that is dependent upon the value of the weather information.

Preferably, the weather station apparatus include a color scheme of a plurality of predetermined colors for indicating the weather information according to a series of predetermined ranges of the value of the weather information, with each color indicating a corresponding range of value of the weather information.

More preferably, the color scheme is embedded in the microprocessor control unit for operation thereby.

Further more preferably, the color scheme follows generally that of a rainbow, with the colors changing towards warmer colors in one direction of change in the value of the weather information and towards cooler colors in the opposite direction of change.

It is preferred that the colors of the color scheme for temperature as the atmospheric parameter change towards warmer colors for increasing temperature and change towards cooler colors for decreasing temperature.

It is preferred that the colors of the color scheme for humidity as the atmospheric parameter change towards warmer colors for decreasing humidity and change towards cooler colors for increasing humidity.

It is preferred that the colors of the color scheme, for weather forecast as the atmospheric parameter change towards warmer colors for sunnier forecast and change towards cooler colors for cloudier forecast.

It is preferred that the colors of the color scheme for UV index as the atmospheric parameter change towards warmer colors for stronger radiation and change towards cooler colors for weaker radiation.

Preferably, the light source comprises one or more light-emitting diodes.

More preferably, the light source comprises an RGB light-emitting diode.

In a specific construction, the casing of the indicator has a relative large portion which is light diffusive and within which the light source is located, so that light from the light source is operatively diffused out through that portion of the casing.

In a preferred embodiment, the base station includes a plurality of said sensors for sensing different types of atmospheric parameters, selected from temperature, humidity, weather forecast and TV index, for subsequent processing by the microprocessor control unit including specifying said types in the weather information.

More preferably, the control circuit of the indicator includes selecting means to enable user selection of the type of weather information for indication by said illumination of the light source.

Further more preferably, the selecting means comprises a switch provided on the casing of the indicator.

It is preferred that the control circuit of the indicator further includes identifying means to identify the type of weather information indicated by said illumination of the light source.

It is further preferred the identifying means comprises an identifier selected from literal and graphic representations.

In a preferred embodiment, the base station includes a display located on the housing, which is controlled by the microprocessor control unit to display the weather information evaluated by the microprocessor control unit.

BRIEF DESCRIPTION OF DRAWINGS

The patent or application contains at least one drawing executed in color. Copies of this patent or patent application publication with the color drawing(s) will be provided by the Office upon request and payment of the necessary fee.

The invention will now be more particularly described, by way of example only, with reference to the accompanying drawings, in which:

FIG. 1 is a front view of a base station of an embodiment of weather station apparatus in accordance with the invention;

FIG. 3 is a left side view of the base station of FIG. 1;

FIG. 5 is a front view of a remote indicator of the weather station apparatus, co-operable with the base station of FIG. 1;

FIG. 6 is a right side view of the indicator of FIG. 5;

FIG. 7 is a rear view of the indicator of FIG. 5;

FIG. 9 is a schematic diagram showing a color scheme adopted by the aforesaid base station and indicator; and FIG. 10 is a schematic diagram equivalent to FIG. 9, using colors.

DETAILED DESCRIPTION OF PREFERRED EMBODIMENT

Figure 2:
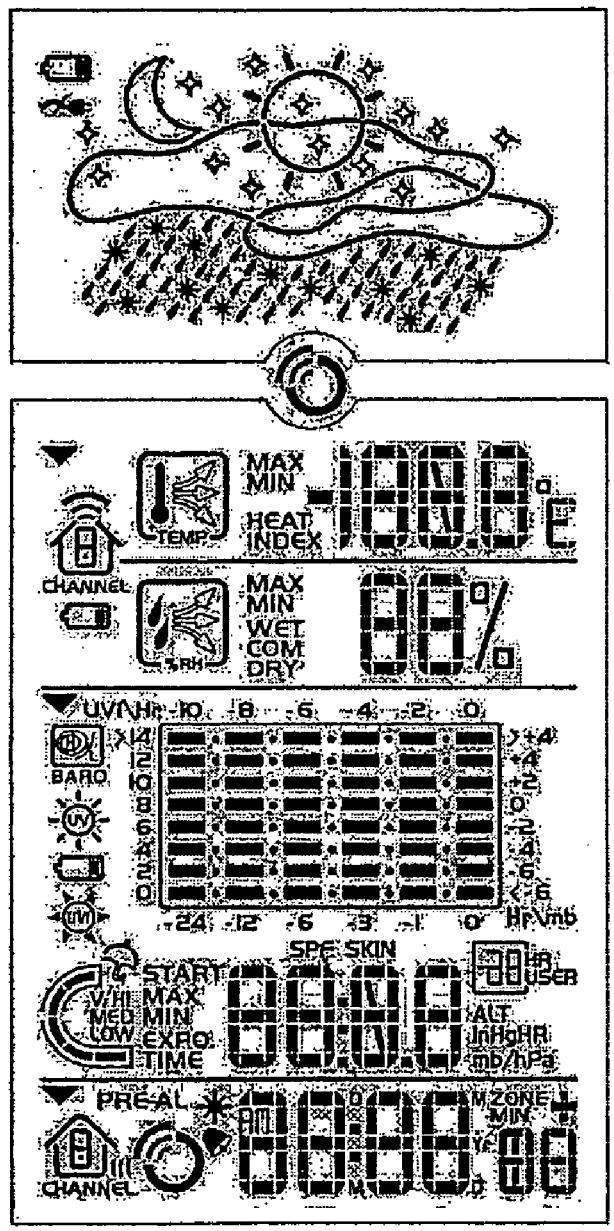
FIG. 2 is a front view of a display of the base station of FIG. 1.
Figure 4:
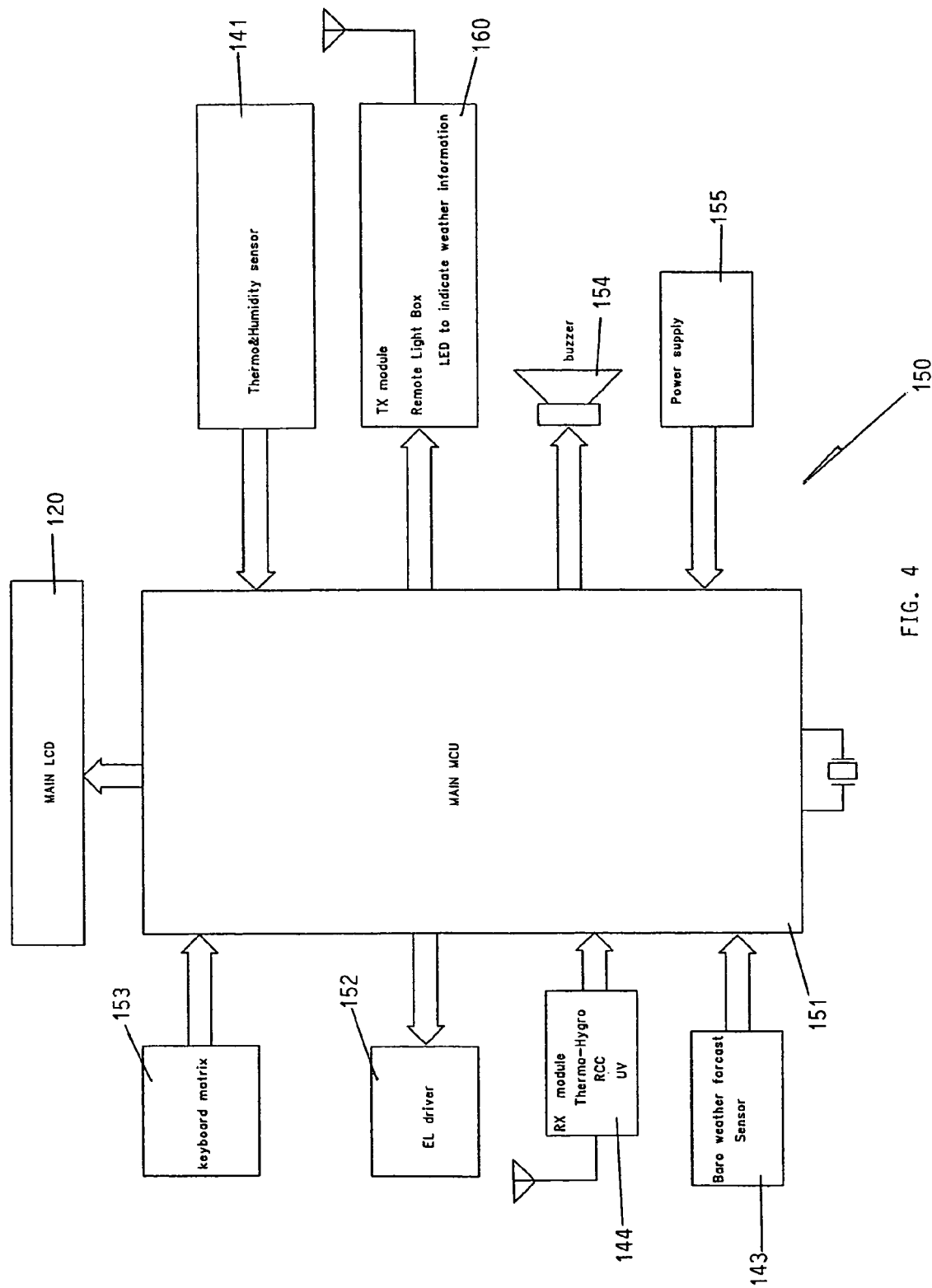
FIG. 4 is a schematic functional block diagram of an operating circuit of the base station of FIG. 1.
Figure 8:
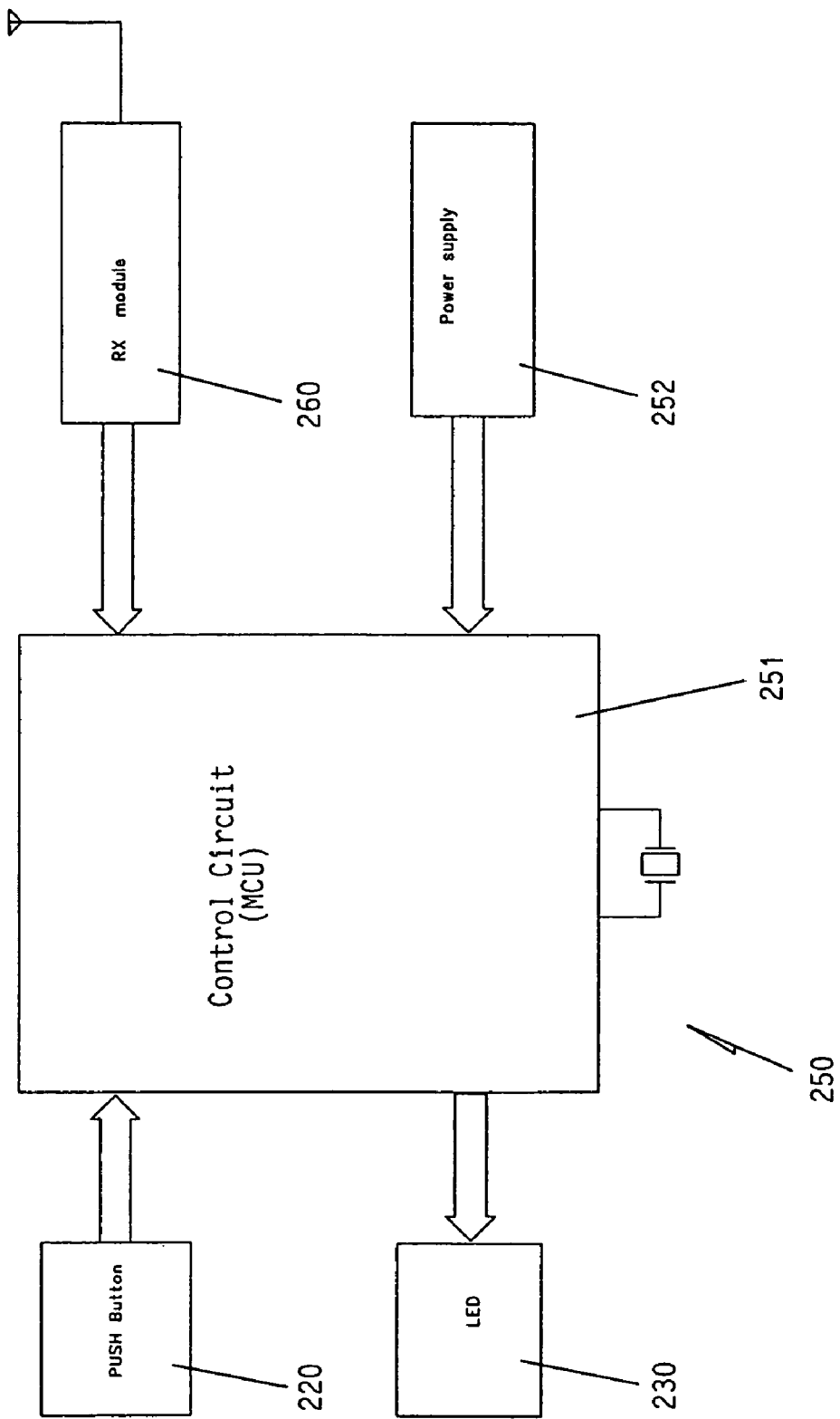
FIG. 8 is a schematic functional block diagram of an operating circuit of the indicator of FIG. 5.

Referring to the drawings, there is shown weather station apparatus embodying the invention for measuring and indicating weather information, which comprise a base station 100 and a remote indicator 200 in communication therewith via a wireless RF (radio frequency) link at a frequency of say 433 MHz.

The base station 100 has an upright generally flat housing 110, on which there are located an LCD display on the front and two rows each of four operating keys 130 on opposite left and right sides, and in which there is housed an operating circuit 150. The operating circuit 150 is built based on an MCU (microprocessor control unit) 151 to perform various weather and clock operations and control, including as a primary function determining or evaluating weather information relating to parameters of the atmosphere of various types, including four major types that represent temperature, humidity, weather forecast and UV (ultraviolet) index.

A number of weather sensors are employed to sense such atmospheric parameters for subsequent processing by the MCU 151. These include a composite thermo/humidity sensor 141 for sensing (indoor) temperature and humidity and a baro weather forecast sensor 143 for barometric pressure assessment and weather forecast, both of which are wired to the MCU 151 and located on or inside the station housing 110.

There are other sensors that are placed at a remote or outdoor location, such as a thermo-hygro sensor for measuring (outdoor) temperature and humidity and a UV sensor for detecting the intensity level of solar UV radiation (for UV index). Such remote sensors are associated with the MCU 151 by means of a wireless RF link that involves the use of a multi-channel receiver module 144 connected to the MCU 151 in the housing 110. The receiver module 144 also receives and synchronizes with the RF time/calendar signal broadcast by the local authority of the country or time zone concerned for show the time/date on the display 120.

The base station 100 includes an RF transmitter 160 as part of the operating circuit 150 in the housing 110. Certain other parts of the operating circuit 150 are an electroluminescence (EL) driver 152 for EL backlighting of the display 120, a keyboard matrix 153 that implements the keys 130, a piezo-electric buzzer 154 for generating audio announcement or sound such as a clock alarm signal, and a power supply 155.

The MCU 151 is programmed and calibrated to process the weather input signals received from the aforesaid sensors, including carrying out appropriate computation to evaluate the weather information of the aforesaid four major types in particular based on the input signals. Such weather information comprises numerical data for temperature and humidity, categories by the name for weather forecast condition and numerical scales for UV index (as hereinafter described), all of which are herein generally referred to as "value" of the weather information.

Indoor temperature is measurable in the range from −5° C. to +50.0° C. (23° F. to 122.0° F.) and outdoor (remote) temperature from −20.0° C. to +60.0° C. (−4.0° F. to +140.0° F.). Both indoor and outdoor humidity can be measured in the range from 25% to 95%. These are weather information values expressed in numerical form.

Barometric pressure may be measured and displayed in mb/hPa or in Hg, with built-in automatic compensation or adjustment for altitude from −100 m to 2500 m. According to the trend of change in atmospheric pressure, it is possible to ascertain the current weather condition and predict the forthcoming weather condition. For this purpose, the microprocessor 80 is programmed based on an appropriate algorithm to identify the weather forecast by one of five categories, namely "Snowy", "Rainy", "Cloudy", "P-Cloudy" (Partly Cloudy) or "Sunny". These are weather information values expressed in alphabets, by description.

The ozone layer shields the Earth from harmful solar UV radiation, but ozone depletion as well as seasonal and weather conditions cause different amount of UV radiation to reach the Earth at any given time. The UV index in general predicts the next day's UV radiation levels on an official scale from 1 to 11+, that being weather information values expressed by degree.

Upon working out the aforesaid weather information values, the MCU 151 will send them to the display 120 for direct readout and, more importantly. The MCU 151 will also generate corresponding output signals representing the weather values of the aforesaid four types. The output signals will then be amplified, modulated and transmitted by the RF transmitter 160 as a wireless RF signal for reception by the remote indicator 200.

The output signals are encoded and packed together by the MCU 151 and transmitted according to a data protocol in which the weather information values of the four types may be formatted as a series of data bits, with each value being a 4-bit code that represents a range (within which the exact value falls) preceded by a 2-bit identifier that specifies the type concerned.

Referring to the remote indicator 200, it has a generally flat square casing 210 which includes a curved front wall 211 and a slender right side wall 215, the front wall 211 being divided into a translucent wide left portion 212 of a light neutral color (e.g. light milky white) and a strip portion 213 vertically on the right side. An inverted keyhole 219 at the rear wall allows the casing 210 to be hanged on a wall. The strip portion 213 is generally opaque except at four small translucent regions 214 where the wall is printed with letters "UV" (for UV index), "WEATHER" (for weather forecast), "% RH" (for relative humidity) and "TEMP" (for temperature). An alternative to such literal representations would be the use of graphic symbols, such as sun and thermometer icons. There is a pushbutton switch selector 220 located on the right side wall 215.

Housed within the casing 210 are at least one and preferably five super bright tricolor RGB LEDs (red-green-green light-emitting diodes) 230, an operating circuit 250 based upon an IC control circuit 251 primarily for controlling the operation of the RGB LEDs 230, and an RF receiver 260 connected to the control circuit 251. There is also a DC power supply adaptor 252 connected to the control circuit 251 for power.

The RGB LEDs 230 are capable of changing the color its light dependent upon the (relative) magnitudes of driving currents supplied to its three internal component color LEDs or associated terminals, as is generally known in the art. They are evenly positioned at the centre and near the four corners behind the front wall left portion 212, which is translucent such that light from the LEDs 230 can diffuse out therethrough to illuminate the indicator 200 vividly in a controlled color.

The receiver 260 is tuned in (i.e. at 433 MHz resonance) with the transmitter 160 of the base station 100 for receiving the aforesaid wireless RF signal transmitted by the transmitter 160. The received signal will in turn be demodulated and fed to the control circuit 251 for processing and in particular distinguishing between the four types of weather information and extracting their values (quantized into ranges).

The selector 220 is connected to the control circuit 251 and enables user-selection in situ, i.e. right at the indicator 200 for convenience, of one desired type (and value) of weather information for indication by the indicator 200. The selection is identified by small LEDs located individually behind the translucent regions 214 of the casing strip portion 213, which will be lit up by the control circuit 251 in turn upon repeated pressings of the selector 220 to signal the chosen type.

Upon the selection of a type as desired, the value of the associated weather information is indicated by the control circuit 251 energizing the RGB LEDs 230 to illuminate the indicator 200 in a predetermined color in accordance with a corresponding color scheme or pattern that is embedded in the MCU 151 of the base station 100.

As illustrated in FIGS. 9 and 10, the color scheme stipulates a sequence of colors for indicating the (each) weather information according to, or dependent upon, a series of ranges of the value of the weather information, with each color indicating a corresponding range of the value. For example, the ranges of temperature are defined in steps of 10° C., the ranges of humidity are divided in steps of 20%, the ranges of UV index are classified as scales 0-2, 3-5, 6-7, 8-10 and 11+, and the ranges of weather forecast are categorized as "Snowy", "Rainy", "Cloudy", "P-Cloudy" and "Sunny".

It is observed that the color scheme follows generally the color spectrum of a rainbow, with the colors changing towards warmer colors (e.g. orange or red) in one direction of change in the value of the weather information and towards cooler colors (e.g. turquoise or blue) in the opposite direction of change.

In this specific embodiment, the colors for temperature change towards red for increasing temperature and towards lavender (or rose) for decreasing temperature. The colors for humidity change towards light orange for decreasing humidity and towards blue for increasing humidity. The colors for weather forecast change towards light orange for sunnier forecast and towards light turquoise for cloudier forecast (that is snowy in the worst case). The colors for UV index change towards pink for stronger radiation and towards bright green for weaker radiation. As the colors available for use are dependent upon the length of the color scales as well as contrast between adjacent colors, slight variance from the rainbow color sequence would be difficult to avoid.

The subject invention provides self-contained weather station apparatus that offer an interesting, eye-catching light indication of weather information in a gradually changing color as the conditions develop. The light source, preferably RGB LEDs, is installed in a remote indication device which communicates with a weather station by wireless RF radiation and is therefore free to move. This provides an easy and convenient means for the user to have quick glances at a location wherever he or she wants and to select the type of information indicated in situ. Other weather information may likewise be displayed, such as comfort level, rainfall, wind speed, wind direction, soil moisture and pollen type, etc.

The invention has been given by way of example only, and various other modifications of and/or alterations to the described embodiment may be made by persons skilled in the art without departing from the scope of the invention as specified in the appended claims.

For example, the change of lighting color of the remote indicator may be rendered gradual or continuous for smooth variation. Also, the RGB LED 230 may be replaced by a cluster of three red, green and blue mono-colored LEDs for illumination in a variable resultant color that is dependent upon the relative brightness of the three individual LEDs.

What is claimed is:

1. A weather station apparatus for measuring and indicating weather information, comprising a base station and a remote indicator wherein, the base station includes:
a housing,
a microprocessor control unit in the housing for operation and control, including evaluating weather information having a value relating to an atmospheric parameter selected from the group consisting of humidity, weather forecast, and UV index,
at least one sensor associated with the microprocessor control unit for sensing the atmospheric parameter for subsequent processing by the microprocessor control unit, and
a transmitter in the housing for transmitting a wireless signal representing the weather information evaluated by the microprocessor control unit, and the remote indicator includes:
a casing,
a receiver in the casing for receiving the wireless signal from the transmitter,
a control circuit in the casing for processing the wireless signal, and
a color-changing light source in the casing and controlled by the control unit for illumination to indicate the weather information represented by the wireless signal in a color scheme embedded in the microprocessor control unit and including a plurality of predetermined colors for indicating the weather information according to a series of predetermined ranges of the value of the weather information, each color indicating a corresponding range of value of the weather information, wherein the color scheme follows generally that of a rainbow, with the colors changing towards warmer colors in one direction of change in the value of the weather information and towards cooler colors in the opposite direction of change.

2. The weather station apparatus as claimed in claim 1, wherein the light source comprises one or more light-emitting diodes.

3. The weather station apparatus as claimed in claim 2, wherein the light source comprises a red-green-blue (RGB) light-emitting diode.

4. The weather station apparatus as claimed in claim 1, wherein the casing of the indicator has a portion which is light diffusive and within which the light source is located, so that light from the light source is diffused through that portion of the casing.

5. The weather station apparatus as claimed in claim 1, wherein the base station includes a plurality of the sensors for sensing respective atmospheric parameters selected from the group consisting of humidity, weather forecast, and UV index, for subsequent processing by the microprocessor control unit.

6. The weather station apparatus as claimed in claim 5, wherein the control circuit of the indicator includes selecting means for user selection of the atmospheric parameter for indication by illumination of the light source.

7. The weather station apparatus as claimed in claim 6, wherein the selecting means comprises a switch located on the casing of the indicator.

8. The weather station apparatus as claimed in claim 6, wherein the control circuit of the indicator further includes identifying means to identify the atmospheric parameter indicated by illumination of the light source.

9. The weather station apparatus as claimed in claim 8, wherein the identifying means comprises an identifier selected from literal and graphic representations.

10. The weather station apparatus as claimed in claim 1, wherein the base station includes a display located on the housing and controlled by the microprocessor control unit to display the weather information evaluated by the microprocessor control unit.

* * * * *